US009422976B2

(12) United States Patent
Handreck

(10) Patent No.: US 9,422,976 B2
(45) Date of Patent: Aug. 23, 2016

(54) AXIAL-RADIAL ROLLING CONTACT BEARING, IN PARTICULAR FOR SUPPORTING ROTOR BLADES ON A WIND TURBINE

(75) Inventor: Thomas Handreck, Anroechte (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 501 days.

(21) Appl. No.: 13/983,906

(22) PCT Filed: Feb. 16, 2012

(86) PCT No.: PCT/EP2012/052680
§ 371 (c)(1),
(2), (4) Date: Sep. 30, 2013

(87) PCT Pub. No.: WO2012/110595
PCT Pub. Date: Aug. 23, 2012

(65) Prior Publication Data
US 2014/0010660 A1    Jan. 9, 2014

(30) Foreign Application Priority Data

Feb. 16, 2011    (DE) .......................... 10 2011 000 769

(51) Int. Cl.
| F03D 11/00 | (2006.01) |
| F16C 19/38 | (2006.01) |
| F03D 1/06 | (2006.01) |
| F16C 33/60 | (2006.01) |

(52) U.S. Cl.
CPC ............ *F16C 19/381* (2013.01); *F03D 1/0658* (2013.01); *F03D 11/0008* (2013.01); *F03D 80/70* (2016.05); *F16C 33/60* (2013.01); *F16C 2300/14* (2013.01); *F16C 2360/31* (2013.01); *Y02E 10/721* (2013.01); *Y02E 10/722* (2013.01)

(58) Field of Classification Search
CPC ... F03D 1/0658; F03D 11/008; F16C 19/381; F16C 33/60; F16C 2360/31; F16C 2300/14
See application file for complete search history.

(56) References Cited

U.S. PATENT DOCUMENTS

| 1,776,647 | A |   | 9/1930 | Zubler |   |
| 3,652,141 | A | * | 3/1972 | Husten | F16C 19/30 384/455 |
| 4,422,697 | A | * | 12/1983 | Gugel | F16C 19/381 384/452 |
| 4,989,999 | A | * | 2/1991 | Siemensmeyer | F16C 19/381 384/455 |
| 5,501,533 | A | * | 3/1996 | Williams | F16C 19/502 384/560 |
| 5,690,434 | A | * | 11/1997 | Beshoory | E21B 4/003 175/107 |

(Continued)

FOREIGN PATENT DOCUMENTS

| CN | 201314333 Y | 12/2008 |
| CN | 101363472 A | 2/2009 |

(Continued)

*Primary Examiner* — Igor Kershteyn
(74) *Attorney, Agent, or Firm* — Andrew Wilford

(57) ABSTRACT

An axial-radial roller-bearing assembly for mounting rotor blades on a wind-power plant has a first bearing ring forming a race and centered on a bearing axis and a second bearing ring forming another race coaxial to the race formed by the first bearing ring. A radial roller bearing with rollers as rolling elements is between the first and second bearing rings. First, second, third, and fourth axial roller bearings have rollers serving as rolling elements between the first and second bearing rings and axially spaced from one another. The radial roller bearing is axially between the second and third axial roller bearings.

13 Claims, 3 Drawing Sheets

(56) References Cited

U.S. PATENT DOCUMENTS

| | | |
|---|---|---|
| 8,047,792 B2 | 11/2011 | Bech |
| 8,282,353 B2 * | 10/2012 | Russ .................... F03D 1/0658 416/131 |
| 2007/0071384 A1 | 3/2007 | Dambaugh et al. |
| 2008/0213095 A1 | 9/2008 | Bech et al. |
| 2009/0022442 A1 | 1/2009 | Bech et al. |
| 2009/0175724 A1 | 7/2009 | Russ |
| 2009/0257697 A1 | 10/2009 | Andersen |
| 2010/0215307 A1 | 8/2010 | Loeschner et al. |
| 2010/0322543 A1 | 12/2010 | Paluncic |
| 2011/0084816 A1 | 4/2011 | Briese et al. |
| 2011/0085756 A1 | 4/2011 | Hori |
| 2011/0115233 A1 | 5/2011 | Schroeppel |
| 2013/0202238 A1 | 8/2013 | Sommer et al. |

FOREIGN PATENT DOCUMENTS

| | | |
|---|---|---|
| CN | 201301900 Y | 9/2009 |
| CN | 201517560 U | 9/2009 |
| CN | 101761554 A | 11/2009 |
| CN | 201593558 U | 11/2009 |
| CN | 101793290 A | 8/2010 |
| CN | 101878373 A | 11/2010 |
| DE | 102007057253 A | 6/2009 |
| DE | 102007062056 A | 6/2009 |
| DE | 102008062910 A1 | 6/2010 |
| EP | 2212572 B1 | 8/2010 |

\* cited by examiner

AXIAL-RADIAL ROLLING CONTACT BEARING, IN PARTICULAR FOR SUPPORTING ROTOR BLADES ON A WIND TURBINE

CROSS REFERENCE TO RELATED APPLICATIONS

This application is the US-national stage of PCT application PCT/EP2012/052680 filed 16 Feb. 2012 and claiming the priority of German patent application 102011000769.5 itself filed 16 Feb. 2011.

FIELD OF THE INVENTION

The invention relates to an axial-radial roller-bearing assembly, in particular for mounting rotor blades on a wind-power plant, comprising a first bearing ring and a second bearing ring that form an inner race and an outer race, and comprising a radial roller bearing having a plurality of axial roller bearings between the first and second bearing rings.

BACKGROUND OF THE INVENTION

According to the standard design, known wind-power plants comprise a tower at whose upper end a generator is mounted in a generator housing. A rotor is connected to the generator, either directly or by a gearbox, and typically carries three rotor blades. So as to adjust the positions of the rotor blades to different wind speeds, the blades are each connected to the rotor for pivoting about a respective longitudinal blade axis. Large diameter axial-radial roller bearings used for this purpose in practical experience are accordingly referred to as pitch bearings. The task of these bearings and of a controller is to adapt the pitch of the rotor blades to the current wind speed or to the operating state of the system. In practice, double-row four-point ball bearings are frequently used for this purpose, such as those described in DE 20 2006 008 288 [US 2010/0322543] and WO 2009/147865 [US 2010/0085756], for example. Double-row four-point ball bearings can be manufactured comparatively cost-effectively, are quite compact, and can transfer high torques.

While in the known wind-power plants generally only the pitch of the blades is varied when the wind speed changes significantly, it is now considered desirable to vary the pitch more frequently than before, and in particular synchronously with the rotor speed, so that much higher permanent loads result for the pitch bearings. For this reason axial-radial roller bearings are required that have increased load-bearing capacity and durability with small size. In this context it must be taken into consideration that, under the wind load, very large tilting moments act on the pitch bearing because of the considerable lengths of the rotor blades that in particular axially strain the roller bearings.

Axial-radial roller bearings having the characteristics described above are known from WO 2007/003866 (FIG. 10) [U.S. Pat. No. 8,047,792], DE 20 2005 026 141 and DE 10 2008 009 740 [US 2011/0115233], wherein the axial-radial roller bearings described each have a three-row design with two axial roller bearings set at an axial spacing from each other and an interposed radial roller bearing. So as to be able to absorb the high tilting moments that occur with use as pitch bearings, the rolling elements of the axial roller bearings must have sufficient dimensions.

OBJECT OF THE INVENTION

Under these circumstances, it is the object of the invention to enable maximum load-bearing capacity while optimizing the use of the installation space.

SUMMARY OF THE INVENTION

Proceeding from an axial-radial roller-bearing assembly having the characteristics described above, the object is achieved according to the invention by providing at least four axial roller bearings that are set at an axial spacing from each other, and by providing the radial roller bearing axially between the second and third axial roller bearings. The present invention thus is an axial-radial roller bearing that has at least, and preferably exactly, five rows. While additional axial roller bearings are present as compared to the known designs of pitch bearings, better use of the installation space can be achieved because the diameters of the individual rolling elements can be reduced as a result of the support being distributed among a total of four axial roller bearings.

Even though a design having exactly five roller bearings is preferred, the invention also encompasses embodiments in which, as seen axially, additional bearing rows adjoin one side, or preferably both sides, of the described structure comprising four axial roller bearings and one radial roller bearing. The described five-row structure then forms a section of such a roller bearing. Further roller bearings may be provided so as to further increase the bearing capacity, a symmetrical design being preferred that is centered on the radial roller bearing that is provided according to the invention.

The axial-radial roller bearing according to the invention is particularly suitable for mounting rotor blades on a wind-power plant. In particular the load-bearing capacity and durability can be increased with the installation space that is typically provided for such a pitch bearing. Proceeding from the known constructions, it is therefore not necessary to completely redesign the region of the pitch bearings, the bearing according to the invention also being capable of being retrofitted as part of a maintenance step replacing a double-row four-point bearing having the same size.

Rollers are typically provided as rolling elements for the radial roller bearing and for the four axial roller bearings. The remaining configuration of the rollers is not limited for this purpose, so that these can either have an exactly cylindrical or a barrel-shaped outer surface so as to increase the tolerance against tilting to a certain degree. Rolling elements may be mounted in cages, or cage segments, or be separated from each other by intermediate pieces on the individual bearing rows. In addition to appropriate elements made of plastic, open or closed, and optionally also segmented, steel cages are suited, which can optionally be provided with a polymer coated.

A similar or substantially identical configuration can be provided for all axial roller bearings. The axial roller bearings can in particular have all the same radius and/or comprise identical rolling elements. So as to achieve a uniform distribution of forces, it is also possible for the spacing between the first and second axial roller bearings to be identical to the spacing between the third and fourth axial roller bearings. In this way, the spacing between the first and third axial roller bearings is identical to the spacing between the second and fourth axial roller bearings, which under load in each case cooperate with each other in pairs. According to a particularly preferred embodiment of the invention, the axial roller bearings following one another axially have essentially identical spacings. In addition, the radial roller bearing may also be mounted centrally, or approximately centrally, axially between the second and third axial roller bearings. Extending from a plane extending through the radial roller bearing, substantial symmetry then exists relative the arrangement of the bearing rows. However, a certain asymmetry of the entire bearing generally also results from the bearing protruding axially on one side with one of the bearing rings and on the other side with the other bearing ring, so as to allow connection to the mutually supporting parts on both sides at each end face.

A further preferred embodiment of the invention relates to the configuration of the bearing rings, in that the first bearing ring is divided between the second and third axial roller bearings into two segments, and the second bearing ring is divided between the first and second, and between the third and fourth, axial roller bearings into a total of three segments. Such a divided configuration of the two bearing rings allows particularly cost-effective and simple manufacture, in that the rolling elements are also easy to fit between the bearing rings, which is to say the bearing ring segments. In general, the two-part first bearing ring can be provided as the inner race or outer race, and the second, three-part bearing ring then accordingly forms the outer race or inner race. In a segmented design of the bearing rings, the running surfaces of the individual bearing rows are also easily accessible during manufacture and can be machined with precision. With a segmented design of the bearing rings, in particular very high manufacturing accuracy can also be achieved. Finally, there is the option of varying the prestressing on the individual axial roller bearings by bracing the bearing ring segments relative to each other.

According to a preferred embodiment of the invention, the axial roller bearings are mounted between the bearing rings with differing prestressing. The term "prestressing" within the context of the invention refers to the force acting on the rolling elements in the unloaded state. In the unloaded state of zero, when minor play or force-free contact momentarily exists, this prestress may range up to a considerable permanent force application of the bearing rows, however which always remains below the predetermined maximum load. The prestress can be adjusted by the geometry of the bearing rows, which is to say the dimensions of the rolling elements, and the respective bearing tracks formed in the bearing raceways, the elasticity of the bearing components having to be taken into consideration. If the bearing rings in accordance with the preferred embodiment described above are composed of several bearing ring segments, the prestress may also be adjusted, taking the elasticity into consideration, by the tightening torque of the fastening screws to which the bearing ring segments forming a respective bearing ring are connected.

By adjusting the prestress on the individual axial roller bearings, it can be achieved, for example, that the prestress of the second and third axial roller bearings is greater than that of the first and fourth bearing rows. This preferred embodiment is based on the realization that the moments acting on the axial-radial roller bearing may bring about tilting of the inner race relative to the outer race, so that then, at a particular tilt angle, the absolute travel is greater at the outer axial roller bearings, which is to say the first and fourth axial roller bearings, due to the effective lever, so that these rows are subjected to a higher risk of damage in the case of uniform prestressing of all axial roller bearings. However, a higher prestress of the second and third axial roller bearings ensures that the maximum load of the first and fourth bearing rows is not reached until later in the event of tilting. A higher prestress of the second and third axial roller bearings in particular allows the maximum permitted load on all axial roller bearings to be achieved at approximately the same tilt angle under the action of tilting moments, whereby the overall bearing capacity as a whole is maximized.

A further aspect of the present invention relates to the attachment of the axial-radial roller bearing, in that throughgoing holes for fasteners are provided on at least one of the bearing rings. Fasteners such as screws pose the problem that additional forces are generated during tightening, which may modify the geometry of the bearing rows due to the elasticity of the material of the bearing rings. So as to reduce this influence, a recess, and more particularly a blind hole, may be provided at the throughgoing holes, extending from an end face of the respective bearing ring, so as to axially shift the force support point of the respective fastener, which is customarily a screw, into the respective bearing ring.

The invention further relates to a wind-power plant comprising a rotor and rotor blades that can each be rotated about a rotor longitudinal axis and are connected to the rotor by the axial-radial roller bearing.

BRIEF DESCRIPTION OF THE DRAWING

The invention will be described in greater detail hereafter based on a drawing showing only one illustrated embodiment. Therein.

SPECIFIC DESCRIPTION OF THE INVENTION

Figure 1:
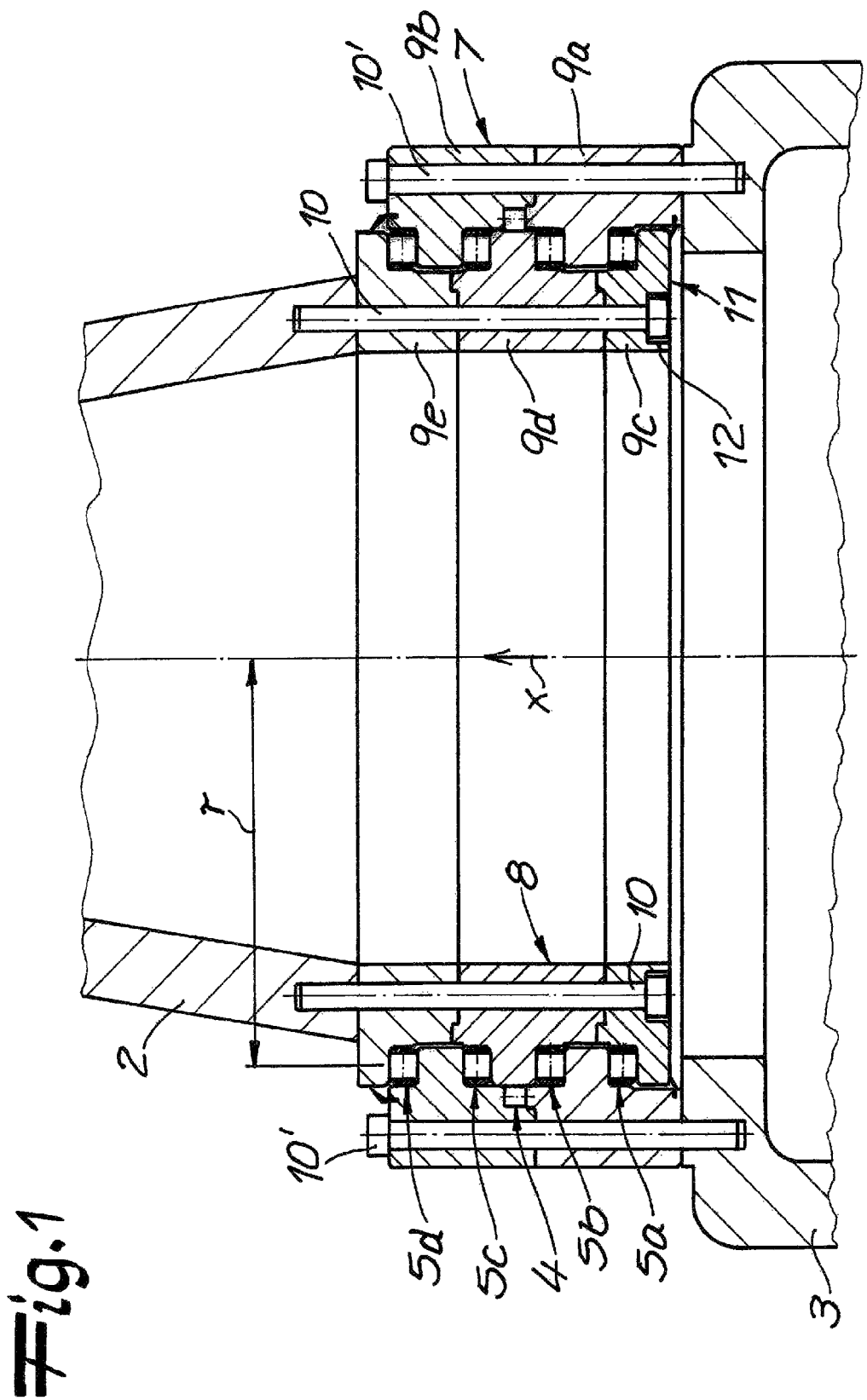
FIG. 1 shows an axial-radial roller bearing according to the invention, serving as a pitch bearing connecting a rotor blade of a wind-power plant to the rotor.

FIG. 1 shows an axial-radial roller-bearing assembly connecting a rotor blade 2 to a rotor 3 on a wind-power plant 1. An actuator that can pivot the rotor blade 2 about its longitudinal axis is not shown for clarity purposes.

Figure 2:
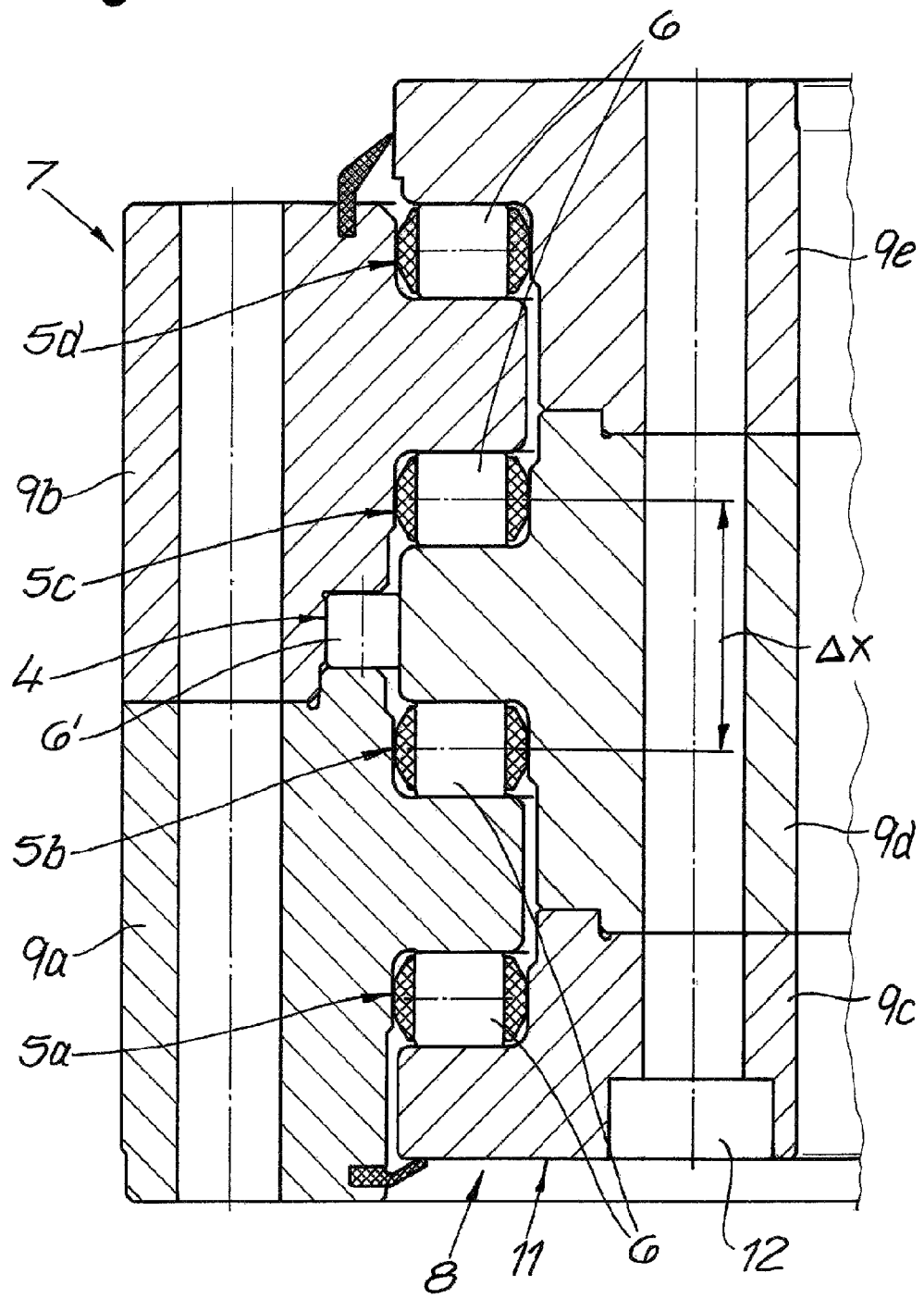
FIG. 2 is a section through a detail of the bearing of FIG. 1.

The axial-radial roller bearing shown in a detailed sectional view in FIG. 2 has a five-row design and comprises one radial roller bearing 4 and four axial roller bearings 5$a$, 5$b$, 5$c$, 5$d$. The rolling elements, designed as rollers 6 and 6', of the radial roller bearing 4 and axial roller bearings 5$a$, 5$b$, 5$c$, 5$d$ are mounted between a first bearing ring 7 forming an outer race and a second bearing ring 8 forming an inner race. The first bearing ring 7 is divided into two segments between the second axial roller bearing 5$b$ and the third axial roller bearing 5$c$, the segments 9$a$ and 9$b$ being separated outside the running surface for the radial roller bearing 4 so as not to impair the running properties there. The second bearing ring 8 is divided into three segments 9$c$, 9$d$, and 9$e$, the separation being made between the first axial roller bearing 5$a$ and the second axial roller bearing 5$b$, and between the third axial roller bearing 5$c$ and the fourth axial roller bearing 5$d$. The axial roller bearings 5$a$, 5$b$, 5$c$, 5$d$ have the same radius r and, in axially identical spacings $\Delta x$ and also comprise identical rolling elements. This results in particularly uniform axial support x, the support being distributed to all four axial roller bearings 5$a$, 5$b$, 5$c$ and 5$d$. Because of the forces that typically act when mounting rotor blades, only one radial roller bearing 4 is sufficient for radial mounting. Because of the uniform distribution of the axial forces on the four axial roller bearings 5$a$, 5$b$, 5$c$, 5$d$, it is possible to provide comparatively small rollers 6, so that the bearing capacity that can be achieved in the overall is very high, with a small physical size.

So as to further increase the bearing capacity, according to a preferred embodiment of the invention the prestress of the second axial roller bearing 5b and the third axial roller bearing 5c is greater than that of the first axial roller bearing 5a and the fourth axial roller bearing 5d. When rotor blades 2 are mounted, very high tilting moments may occur due to the considerable lengths of the rotor blades 2 and the load due to wind pressure, which tilt the first bearing ring 7 relative to the second bearing ring 8. Given the effective lever, the absolute travel at the first axial roller bearing 5a and the fourth axial roller bearing 5d is greater than at the center axial roller bearings 5b, 5c. In general, the risk of overload would thus be higher at the outer axial roller bearings 5a, 5d in the case of identical prestress on all axial roller bearings 5a, 5b, 5c, 5d. However, by varying the prestress, a predetermined maximum load can be applied to all four axial roller bearings 5a, 5b, 5c, 5d at an approximately identical tilt angle, so that in the overall maximized bearing capacity is assured.

With respect to use in wind-power plants, it must be taken into consideration that subsequent maintenance and a replacement of the bearings is extremely complex and should therefore be avoided to the extent possible.

According to FIG. 1, the second bearing ring 8 is connected to the rotor blade 2 by screws 10 and the first bearing ring 7 is connected to the rotor 3 by screws 10'. So as to prevent the tightening of the screws 10 at the second bearing ring 8 from resulting in a change of the geometry of the first axial roller bearing 5a, a recess 12 in the form of a countersink is provided, opening at an end face 11 of the second bearing ring 8, so as to shift the force support point of the head of the screw 10 parallel to the axial direction x into the second bearing ring 8.

Figure 3:
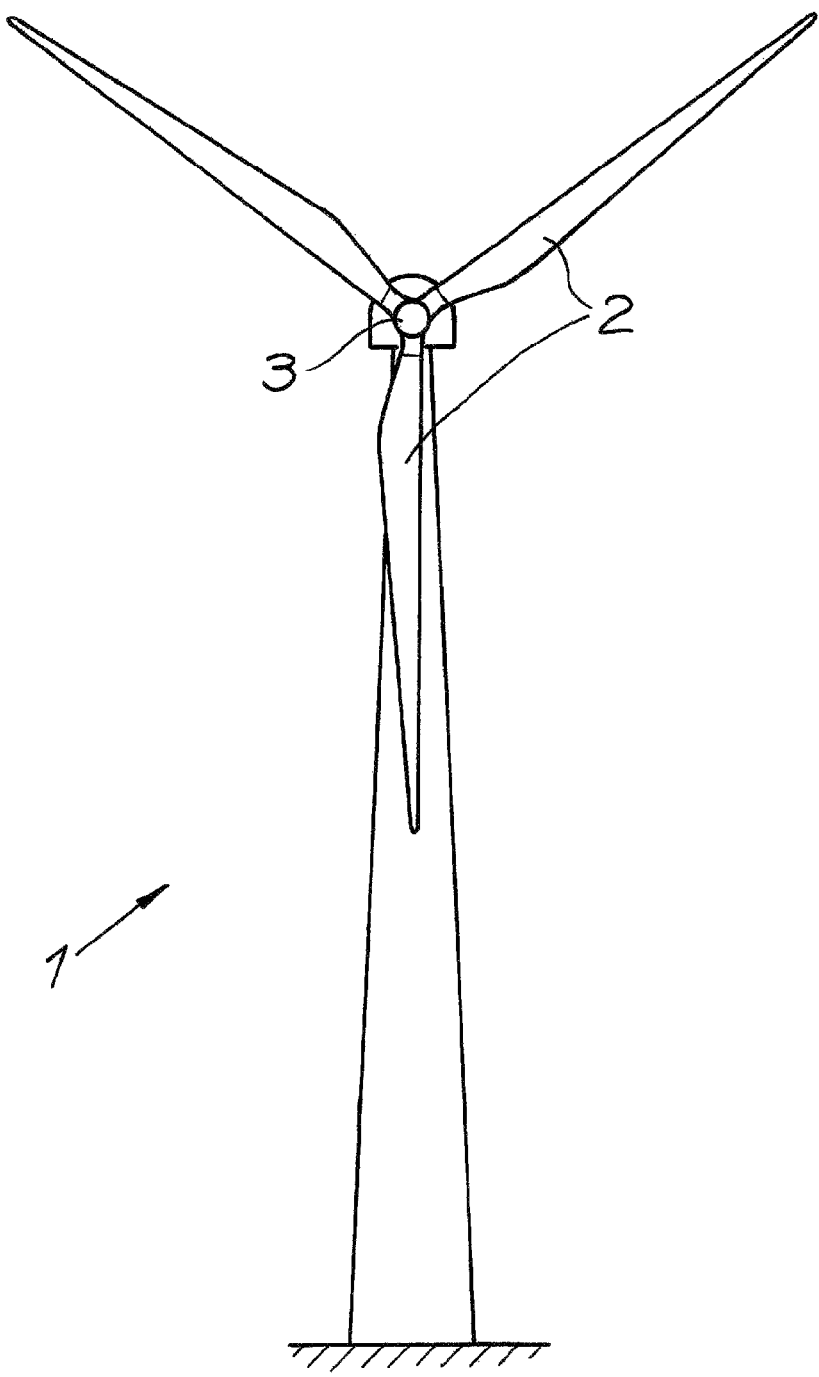
FIG. 3 shows a wind-power plant.

FIG. 3 shows by example a wind-power plant 1 in which three adjustable rotor blades 2 are mounted on a rotor 3.

The invention claimed is:

1. An axial-radial roller-bearing assembly for mounting rotor blades on a wind-power plant, the roller-bearing assembly comprising:
    a first bearing ring forming a race and centered on a bearing axis;
    a second bearing ring forming another race coaxial to the race formed by the first bearing ring;
    a radial roller bearing with rollers as rolling elements and between the first and second bearing rings; and
    first, second, third, and fourth axial roller bearings having rollers serving as rolling elements between the first and second bearing rings and axially spaced from one another, the radial roller bearing being axially between the second and third axial roller bearings.

2. The axial-radial roller-bearing assembly according to claim 1, wherein there are exactly five rows, comprising the four axial roller bearings and the radial roller bearing.

3. The axial-radial roller-bearing assembly according to claim 2, wherein the first bearing ring is divided into two bearing ring segments between the second axial roller bearing and the third axial roller bearing, and the second bearing ring is divided into a total of three segments between the first and second axial roller bearings and between the third and fourth axial roller bearings.

4. The axial-radial roller-bearing assembly according to claim 1, wherein the axial roller bearings are provided between the bearing rings with differing prestresses.

5. The axial-radial roller-bearing assembly according to claim 4, wherein the prestress of the second and third axial roller bearings is greater than that of the first and fourth axial roller bearings.

6. The axial-radial roller-bearing assembly according to claim 1, wherein all the axial bearings have the same radius and identical rolling elements.

7. The axial-radial roller-bearing assembly according to claim 1, wherein the spacing between the first and third axial roller bearings is identical to the spacing between the second and fourth axial roller bearings.

8. The axial-radial roller-bearing assembly according to claim 7, wherein the axial roller bearings succeeding one another in the axial direction have substantially identical spacings.

9. The axial-radial roller-bearing assembly according to claim 1, wherein throughgoing holes for fasteners are provided on at least one of the bearing rings, a countersink being provided at each of the throughgoing holes, extending from an end face of the respective bearing ring, so as to shift a force support point of the respective fastener in the axial direction into the respective bearing ring.

10. A wind-power plant comprising a rotor and rotor blades that can each be rotated about a rotor blade longitudinal axis, wherein each of the rotor blades is connected to the rotor by the axial-radial roller-bearing assembly according to claim 1.

11. The axial-radial roller-bearing assembly defined in claim 1 wherein the rollers of the radial roller bearing are cylindrical and centered on respective axes parallel to the bearing axis, and the rollers of the axial roller bearings are cylindrical and are centered on respective axes extending radially of the bearing axis.

12. An axial-radial roller-bearing assembly for mounting rotor blades on a wind-power plant, the roller-bearing assembly comprising:
    a first bearing ring forming a race, formed by two first bearing-ring segments, and centered on an axis;
    a second bearing ring forming another race coaxial to the race formed by the first bearing ring, and formed by three second bearing-ring segments;
    a radial roller bearing with rollers as rolling elements and between the first and second bearing rings; and
    first, second, third, and fourth axial roller bearings having rollers serving as rolling elements between the first and second bearing rings and axially spaced from one another, the radial roller bearing being axially between the second and third axial roller bearings, the first bearing-ring segments being divided between the second and third axial roller bearings, the second bearing-ring segments being divided between the first and second axial roller bearings and between the third and fourth axial roller bearings.

13. The axial-radial roller-bearing assembly defined in claim 12, wherein the first bearing ring is radially outside the second bearing ring.

* * * * *